THERMOELECTRIC GENERATOR

Filed Dec. 20, 1951 2 Sheets-Sheet 1

INVENTOR
HERSCHEL G. PACK,
BY Munn, Liddy & Nathanson
ATTORNEYS

Sept. 15, 1953 H. G. PACK 2,652,503

THERMOELECTRIC GENERATOR

Filed Dec. 20, 1951 2 Sheets-Sheet 2

INVENTOR

HERSCHEL G. PACK,

BY

Munn, Liddy & Nathanson

ATTORNEYS

Patented Sept. 15, 1953 2,652,503

UNITED STATES PATENT OFFICE 2,652,503

THERMOELECTRIC GENERATOR

Herschel G. Pack, Santa Barbara, Calif.

Application December 20, 1951, Serial No. 262,571

8 Claims. (Cl. 307—149)

This invention relates to thermo-electric generators, and more particularly to an improved device for converting heat energy into electrical energy.

It is an object of this invention to provide a thermo-electric generator that is capable of generating a large current at a practical working voltage.

It is another object of this invention to provide a novel thermo-couple unit capable of being used in generating electric currents of adequate amount.

It is a further object of this invention to provide a manner of interconnecting and arranging thermo-couple units and their terminals or junctions so as to provide maximum efficiency of thermo-electric generators.

It is also an object of this invention to provide a method and means of interconnecting and heating thermo-couple or generator units such that it is possible to produce either a steady or a pulsating current flow from generators of the type disclosed herein.

It is an additional object of this invention to provide means for obtaining useful work from the electrical energy generated in thermo-couple units, either directly, without the use of circuits external to the generator or indirectly.

These and other objects and advantages will be apparent from the following description of the present invention and the accompanying drawings, in which.

Figure 1:
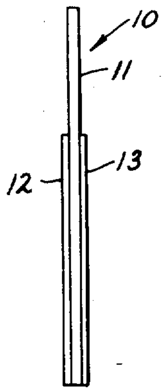
Figure 1 is a side elevational view of a thermo-couple unit used with my invention.

The thermo-electric generator, as shown in the art, converts heat energy directly into electrical energy. The use of steam turbines, etc., together with related equipment is thus dispensed with. The thermo-electrical generator as commonly constructed comprises suitably connected thermo-couple units. As is well known, if dissimilar metals be joined at two places so as to form a thermo-couple and one of the joints be heated, a current will flow in the thermo-couple. The current that flows in the commonly used thermo-couple, however, is very small, and the voltage amounts to only a few millivolts. As a result, it is necessary, if a thermo-electric generator using thermo-couples of practical value is to be devised, to provide thermo-couples and means of employing them such that satisfactory current and voltage characteristics will be obtained. It will appear from the following description that I have developed a generator having desirable output characteristics as well as means for employing the output therefrom.

As shown in Figures 1–4, 10 indicates a thermo-couple unit comprising a flat sheet of copper 11 which may be, for example, ⅛'' thick and 4'' wide by 8'' long. A thin plate 12, of an alloy of zinc and antimony is soldered to one side of sheet 11 with a suitable solder. To the other side of sheet 11 a plate of Monel metal 13 is soldered as by silver solder. The sheets or plates 12 and 13 may have the following dimensions: 3/64'' thick, 5'' long and 4'' wide. Of course other combinations of metals and/or alloys may be used for the units.

The copper sheet 11 serves as a cold junction member for the two elements 12 and 13. The elements 12 and 13 are exposed to heated metal in the generators used in my invention, and grooves 14 are provided on the exposed surfaces of both plates to facilitate thermal as well as electrical contact between the metal and the two plates. Inasmuch as some alloys such as one of zinc and antimony tend to amalgamate with hot mercury or other liquid metal the surfaces of the plates or sheets 12 and 13 are protected with a thin coating of a metal such as iron or chromium which will be resistant to the action of the hot liquid metal. The coating is preferably done by electro-plating methods and is of the order of thickness normally associated with electro-plating processes, i. e., .001''. The very thin coating will not affect the operation of the generator.

Figure 2:
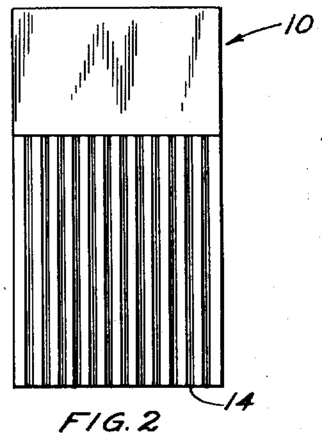
Figure 2 is a front elevational view of the thermo-couple unit shown in Figure 1.
Figure 3:
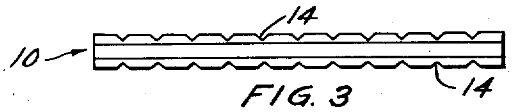
Figure 3 is a bottom view of the thermo-couple unit shown in Figures 1 and 2.
Figure 4:
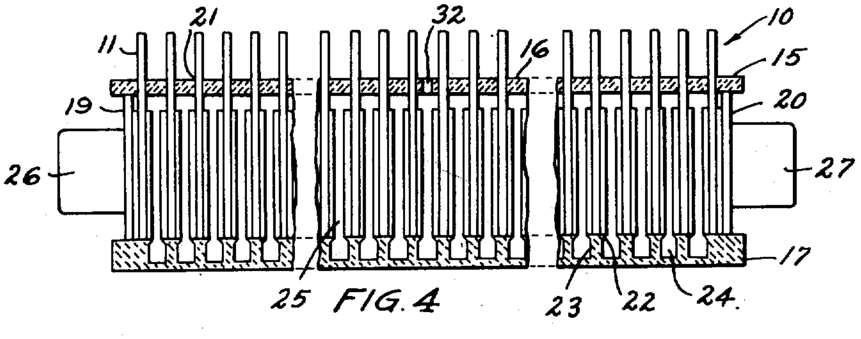
Figure 4 shows a side elevational view partly in section of a generator constructed in accordance with my invention.

Figure 4 illustrates a generator employing a group or stack of the units shown in Figures 1–3, and which are described above. The vessel or container 15 is of an elongated rectangular shape and comprises a top member 16, a bottom member 17 and side members 18 (see Figune 5) composed of a ceramic refractory material. End members or plates 19 and 20 are made of copper and form with the top, bottom and sides a sealed container, the various elements being intimately united after assembly to prevent leakage and the entrance of air. The elements may be united by cementing or by the use of fasteners such as bolts. Various sealing means, such as gaskets, may be employed.

Openings 21 in the top 16 receive the cold junction 11 of the elements 10. The bottom 17 has ledges 22 formed on upstanding legs 23 which serve to support the bottom of the units 10. A liquid tight seal is provided between elements 10 and the legs 23 as well as between the elements and the side walls to prevent short circuits. The space between the legs forms wells 24. As shown in Figure 4, each of the units 10 is supported upon a ledge 22, and there is a space 25, of approximately 1/8'', provided between adjacent units. The end members 19 and 20 are united, as by soldering, to their adjacent units 10. Heavy copper conductors 26 and 27 are soldered to end plates 19 and 20, respectively. The units 10 as well as the end members 19 and 20, butt against the sides and bottom of the vessel and are cemented thereto. There is a small space provided between the vessel top and the tops of the generating units (except for the protruding cooling fins).

Figure 6:
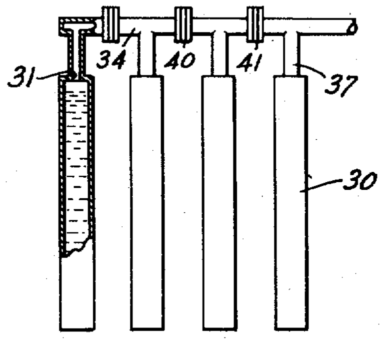
Figure 6 is a front elevational view of a portion of the apparatus as shown in Figure 5.
Figure 5:
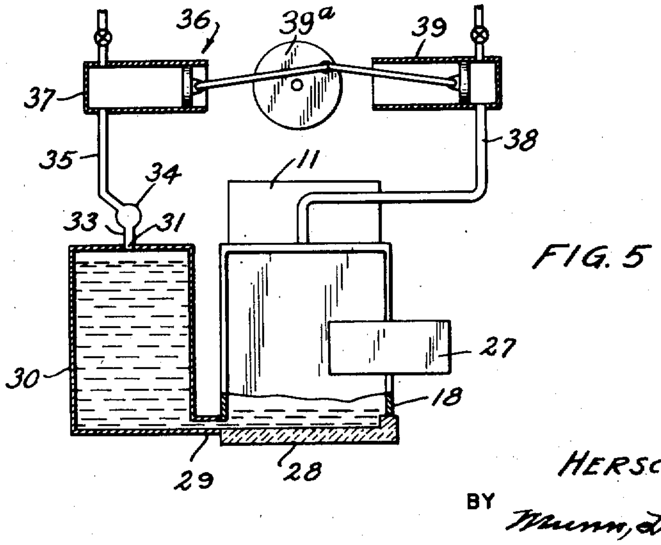
Figure 5 shows a partially sectional, partially schematic and elevational view of the generator shown in Figure 4 and a means for interconnecting and heating the thermo-couple units.

There is an opening 28 provided at one side of the wells 25. The opening 28 leads to a connecting tube 29 which in turn leads to a reservoir 30. There is one such reservoir and connection for each well in the ceramic base. The reservoirs and connecting tubes are thin and made of a metal such as Monel metal. The reservoirs are relatively narrow and of large surface area so that a number of them may be placed side by side (see Figure 6). The reservoirs together with the wells and connecting tubes are filled with a conductive medium comprising a liquid metal. Taken together one reservoir, well and tubes has a combined volume such that the liquid metal contained therein amounts to two or more times the quantity required to fill the space between two adjacent thermal units 10. The reservoirs are heated by means such as properly disposed gas burners and as shown in Figures 5 and 6, are filled, except for a slight space at the top, with metal, such as mercury, or sodium, which, in the case of a metal having a high melting point, is maintained in a liquid state by the heat applied to the reservoirs. When the liquid is at the level shown in Figures 5 and 6, there is no metal in the space between adjacent units 10.

There is an opening 31 in the top of each reservoir, and an opening 32 in the top of the generator. Tubes 33 connect the reservoirs to a main 34. A tube 35 leads from the main to a pump generally indicated by 36. The showing of the pump is schematic and tube 35 is shown leading to cylinder 37. A tube 38 leads from opening 32 to a like cylinder 39. The opening 32 leads to the space between one pair of units 10. The generator casing may be suitably cored out to insure communication with the other spaces between the other adjacent units, or a separate pipe and tubing may be provided for each space between adjacent units. These may be connected in a manner similar to that by which the reservoirs are connected to main 34.

The cylinders, tubes and unoccupied space in the system are exhausted of air and an inert gas such as dry nitrogen, is substituted. The pistons are connected by cranks to a fly-wheel 39*a*. It is seen that as the fly-wheel rotates the pistons are alternately moved to the right and then to the left. When moved to the right, as shown in Figure 5, nitrogen is forced down through tube 38 into the generator, and nitrogen is drawn up through tube 35 out of the reservoirs. The total effect of such movement of gas is to force the molten metal into the reservoir and out of the space between adjacent units 10. When the pistons are moved to the left the flow of gas and metal is reversed and liquid metal flows up into the spaces between units 10. As stated above, the pump arrangement is shown schematically only, and obviously other pumps together with suitable valving and supply tanks may be employed to obtain the desired operation.

The units 10 as described above comprise a central cold junction member 11 and two thermocouple elements 12 and 13. The units are stacked in the generator with the elements 12 facing toward one side of the generator and elements 13 facing toward the other side. The fins 11 which project above the generator are exposed to a cooling medium such as a continuous blast of cold air. This serves to maintain the junction between the members 12 and 13 at a temperature lower than that of the surfaces of the elements 12 and 13, which surfaces are exposed to the liquid metal. When the liquid metal rises in the generator it raises the temperature of the adjacent thermo-couple surfaces considerably above the temperature at the cold junction and since the metal is a conductor, forms a hot junction between the adjacent thermocouple elements. The arrangement of the units within the generator being as described above, the metal causes the units to be connected in series. Thus, because of the difference in temperatures between the hot and cold junctions and the thermo-electric characteristics of the units, a current will flow through the generator, out through one of the end members 19, 20 through one of the conductors 26, 27, through the external circuit, and back through the other conductor and end plate.

When the liquid metal is moved out of the generator into the reservoirs the current will cease to flow because the circuit will be broken. The fly-wheel 39*a* thus can be rotated so as to create a pulsating current.

It is obvious that it is only necessary to move the liquid metal in and out from between one pair of generating units to make and break the entire generating circuit. The purpose of rapidly moving the hot metal in and out from between all the units is to maintain maximum difference in temperature between the hot and cold junctions and to attain maximum electrical generation for the amount of heat expended. In other words, to obtain high efficiency.

As shown in Figure 6 and as stated above, the reservoirs 30 are separated from one another for heating purposes. This separation is also necessary to insure that the reservoirs are electrically insulated from one another. In this regard it is necessary that the conduit 34 be supplied with couplings 40 having insulating bushings 41 therein.

Figure 11:
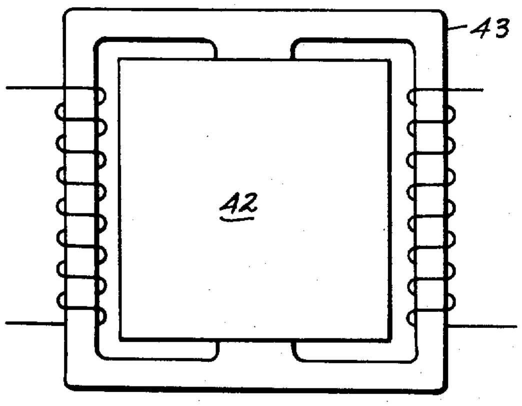
Figure 11 is an elevational view of a generator and a means for utilizing the electrical energy generated therein.

The generator will provide a relatively heavy current providing the resistance of the external circuit is low. However, since the voltage is relatively low, it is desirable to obtain useful work through special equipment. There are several ways of doing this. In Figure 11 for instance, there is shown an effective means of employing the output of the generator. Numeral 42 indicates a generator such as that shown in Figure 4 with the conductors 26 and 27 removed. The generator is placed within a transformer frame 43. The generator thus disposed can be considered to be the primary of the transformer. One or more secondary windings 44 and 45 may be placed on the transformer.

Due to the fact that a pulsating current of controllable frequency can be produced in the generator, it is seen that power can be transferred to the secondary windings. Through the selection of the windings voltages adequate for external circuit use can be obtained at the secondary. Of course, it is not necessary to modify the generator of Figure 4 so as to utilize frame 43 in order to obtain higher voltages as obviously other transformers can be used therewith.

Figure 7:
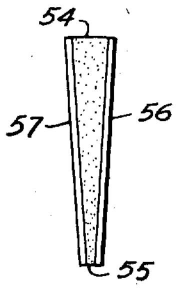
Figure 7 is a plan view of a thermo-couple unit designed for use in generators having a circular shape.
Figure 8:
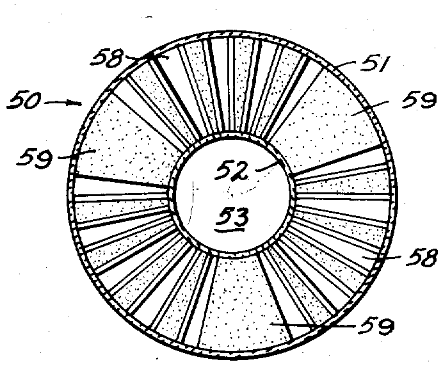
Figure 8 is a plan view of a generator using the units shown in Figure 7.

Figure 7 shows a modified form of thermo-couple unit which may be used in the modified form of generator shown in Figure 8. The modified form shown in Figure 8 is in effect the generator of Figure 4 with the end members 19 and 20, and the conductors 26 and 27 removed, and the remaining portions of the generator bent into the general shape of a hollow cylinder. The modified generator generally indicated by numeral 50 comprises an outer cylinder 51, an inner cylinder 52, and top and bottom members, not shown. The top and bottom members have an opening therethrough corresponding to the central opening 53 formed by the inner cylinder 52. The top and bottom members are constructed similarly to the top and bottom members of the modification shown in Figure 4 and are provided with openings for the cold junction element of the thermo-couple units 54, and wells, respectively. The units 54 are similar to the units shown in Figures 1 to 3, but the central element 55 is wedge or triangular-shaped. The outer elements 56 and 57, however, are of uniform thickness. The units 54 are stacked in the generator casing in a manner similar to that shown in Figure 4 and spaces 58 are provided between adjacent units. The wells and pump may be similar to those disclosed in Figures 5 and 6. Numeral 59 indicates wedge-shaped copper slugs which may be inserted in place of thermo-couple units when it is impractical to fill the entire generator with generating units, or when it is desirable to reduce the number of units.

Figure 9:
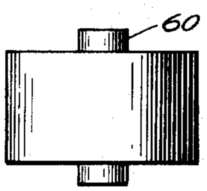
Figure 9 is a side elevational view of a generator such as shown in Figure 8, having an iron core therein.

In Figure 9 the generator of Figure 8 is shown provided with a central core 60. Thus provided the generator constitutes an electro-magnet. Such electro-magnet could be used for example in the manner shown in Figure 11. The units 59 it should be noted extend transversely of the opening 53.

Figure 10:
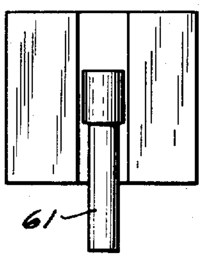
Figure 10 is an elevational view partly in section of a generator such as shown in Figure 8 and a solenoid plunger used therewith.

In Figure 10, the generator of Figure 8 is shown provided with a solenoid plunger 61. The plunger will rise and fall with the pulsation of current in the generator and through suitable mechanical connections useful work can be performed.

Figure 12:
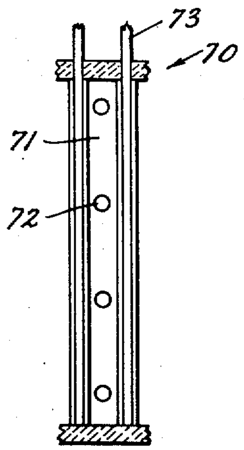
Figure 12 is a side elevational view of a modified form of generator.
Figure 13:
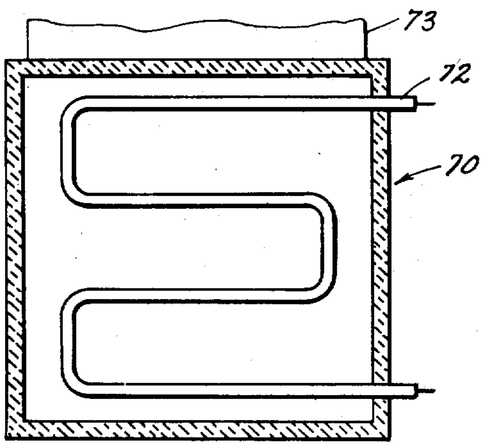
Figure 13 is a side elevational view partly in section of the generator shown in Figure 12.

It may be desirable to have a constant uniform flow of current from the generators, as well as to create magnetic fields which do not vary. This can be accomplished in the previously described modifications by maintaining the molten metal in contact with the thermo-couple units. The steady flow of current can also be obtained through the use of a modified form of generator. In Figures 12 and 13 such a modified generator 70 is shown. The pump reservoirs, wells and connections therefor are not utilized in this modification. The spaces 71 between the generating thermo-couple units are filled with the liquid metal. Heating elements 72 are placed so as to be immersed in such metal. As shown the heating elements might be conventional electrical units. Steam or other fluid might also be circulated through tubes placed in a manner similar to elements 72. As in the previous modification, cold junctions are provided by the copper plates 73 which are subjected to a cooling medium, such as an air blast. This modification of generator may be said to be composed of sealed in units as contrasted with the generators using the pump and reservoirs.

It is obvious that generators may be constructed using a combination of sealed in units and those using the pump and reservoirs. As previously mentioned, it is only necessary to move the liquid metal in and out of the space between one pair of adjacent thermo-couple units in order to make and break the circuits employed.

From the foregoing description it will be seen that I have devised a novel thermo-electric generator as well as a means for effectively employing the electrical energy obtained from such generators. In my generator I utilize principles never before applied to such equipment. As a result of the unique structure, disclosed herein, which structure was developed in the furtherance of the principles employed, my generator is capable of producing current characteristics superior to the previously known devices of this nature.

While I have shown and described a preferred form of my invention, it will be understood that variations in details of form may be made without departure from the invention as defined in the appended claims.

I claim:

1. A thermo-electric generator comprising a vessel, thermo-electric units stacked in spaced relation in said vessel, a conductive medium interposed between adjacent of said units and in contact therewith, and means for causing said medium to alternately move into and out of contact with said adjacent units.

2. A thermo-electric generator comprising a container, thermo-couple units stacked in said container in spaced relation, a fluid conducting medium interposed in the spaces between adjacent thermo-couple units and in contact with said units, and means for alternately withdrawing said fluid from said spaces and reinserting said fluid into said spaces.

3. A thermo-electric generator comprising a vessel having top, bottom and side members, thermo-couple units stacked in said vessel in spaced relationship, end plates for said vessel forming with said top, bottom and side members a closed container, the thermo-couple units immediately adjacent said end plate being connected thereto, a fluid conducting medium disposed in the spaces between adjacent thermo-couple units and in contact with said adjacent units, and means for alternately withdrawing and replacing the medium in contact with said thermo-couple units.

4. A thermo-electric generator comprising a closed vessel, thermo-couple units, each comprising a plate forming a cold junction, a first sheet of material connected to one side of said plate, a second sheet of a material dissimilar to that of the first sheet connected to the other side of said plate, said thermo-couple units being stacked in said vessel in spaced relation with the first sheet of material of all the units facing in the same direction, a fluid conducting medium in contact with said sheets and lying intermediate adjacent units, and means for alternately forcing said medium into and out of contact with said sheets.

5. A thermo-electric generator comprising a closed vessel, thermo-couple units each comprising a plate forming a cold junction, a first sheet of material connected to one side of said plate, a second sheet of a material dissimilar to that of the first sheet connected to the other side of said plate, said thermo-couple units being stacked in said vessel in spaced relation with the first sheet of material of all the units facing in the same direction, a fluid conducting medium in contact with said sheets and lying intermediate adjacent units, and means for moving said medium into and out of the space between at least one pair of adjacent units.

6. A thermo-electric generator comprising a vessel having top, bottom and side members, spaced openings formed in said top member, said bottom member having upstanding spaced legs, spaced ledges formed on said legs, thermo-couple units comprising a cold junction member, a first sheet of material joined to one side of said member and a second sheet of material dissimilar from that of the first sheet, attached to the other side of said member, said cold junction member extending above said first and second sheets, said thermo-couple units being stacked in said vessel with each unit being supported on a ledge and with each cold junction member extending through one of said openings, the space between adjacent thermo-couple units and the adjacent legs supporting said adjacent units being filled with a fluid conducting medium.

7. A thermo-electric generator comprising a vessel, said vessel having an opening extending through the center thereof, thermo-couple units stacked in at least a portion of said vessel, said units being stacked so as to lie transversely of said opening and so that there is a space between adjacent units, a fluid conducting medium disposed in the spaces between adjacent units and in contact with said adjacent units.

8. A thermo-electric generator comprising a vessel, said vessel having an opening extending through the center thereof, thermo-couple units stacked in at least a portion of said vessel, said units being stacked so as to lie transversely of said opening and so that there is a space between adjacent units, a fluid conducting medium disposed in the spaces between adjacent units and in contact with said adjacent units, and means for withdrawing said medium from the space between at least one pair of adjacent units.

HERSCHEL G. PACK.

References Cited in the file of this patent

UNITED STATES PATENTS

| Number | Name | Date |
|---|---|---|
| 2,530,907 | Pack | Nov. 21, 1950 |

FOREIGN PATENTS

| Number | Country | Date |
|---|---|---|
| 675,564 | France | Feb. 5, 1930 |